(12) United States Patent  (10) Patent No.: US 8,842,387 B1
Horide et al.  (45) Date of Patent: Sep. 23, 2014

(54) MICROWAVE-ASSISTED MAGNETIC RECORDING (MAMR) HEAD WITH HIGHLY RESISTIVE MAGNETIC MATERIAL

(71) Applicant: HGST Netherlands B.V., Amsterdam (NL)

(72) Inventors: Tomoya Horide, Odawara (JP); Tomohiro Okada, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 9 days.

(21) Appl. No.: 13/830,810

(22) Filed: Mar. 14, 2013

(51) Int. Cl.
*G11B 5/127* (2006.01)
*G11B 5/235* (2006.01)

(52) U.S. Cl.
CPC ..................................... *G11B 5/235* (2013.01)
USPC ........................................................... 360/110

(58) Field of Classification Search
USPC ................ 360/111, 110, 234.3, 235.4, 245.3, 360/234.6
See application file for complete search history.

(56) References Cited

U.S. PATENT DOCUMENTS

| | | |
|---|---|---|
| 8,027,110 B1 | 9/2011 | Yamanaka et al. |
| 2010/0296194 A1 | 11/2010 | Gubbins et al. |
| 2011/0043943 A1 | 2/2011 | Igarashi et al. |
| 2011/0090603 A1 | 4/2011 | Bai |
| 2011/0216435 A1 | 9/2011 | Shiimoto et al. |
| 2011/0248710 A1 | 10/2011 | Sato et al. |
| 2012/0275060 A1* | 11/2012 | Shimizu et al. ............... 360/110 |
| 2014/0085753 A1* | 3/2014 | Nagasaka et al. .......... 360/234.3 |

OTHER PUBLICATIONS

Zhu et al., "Microwave Assisted Magnetic Recording," IEEE Transactions on Magnetics, vol. 44, No. 1, Jan. 2008, pp. 125-131 (abstract only).

* cited by examiner

*Primary Examiner* — Allen T Cao
(74) *Attorney, Agent, or Firm* — Zilka-Kotab, PC

(57) ABSTRACT

In one embodiment, a high-frequency magnetic field-assisted magnetic recording (MAMR) head includes: a yoke adapted for facilitating magnetic flux through the MAMR head; a main pole magnetically coupled to the yoke and adapted for producing a writing magnetic field; a return pole spaced from the main pole; a spin torque oscillator (STO) positioned above the main pole; and a back gap layer positioned between the yoke and the return pole, where at least one of the yoke, the main pole, the return pole, and the back gap layer comprises a highly resistive magnetic material.

20 Claims, 14 Drawing Sheets

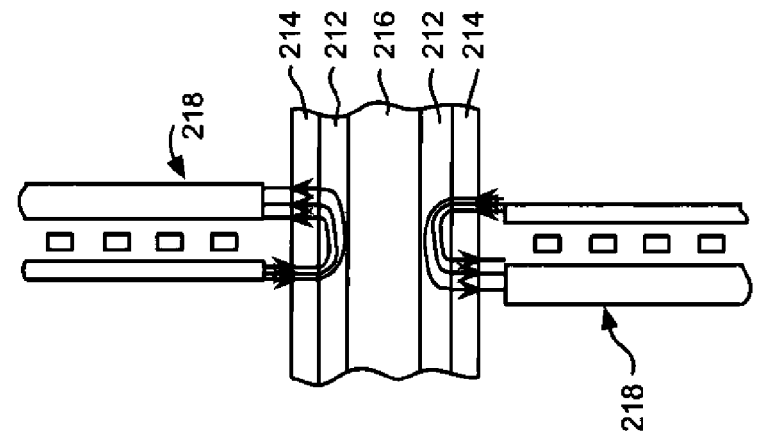
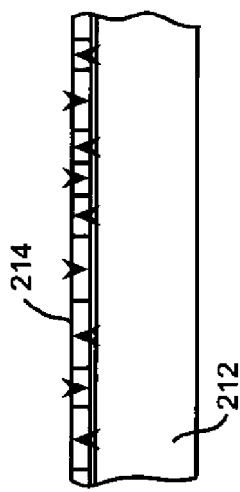
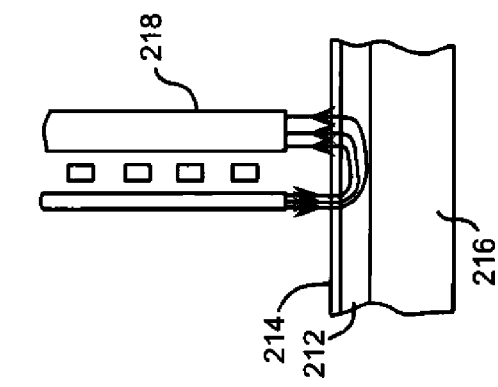
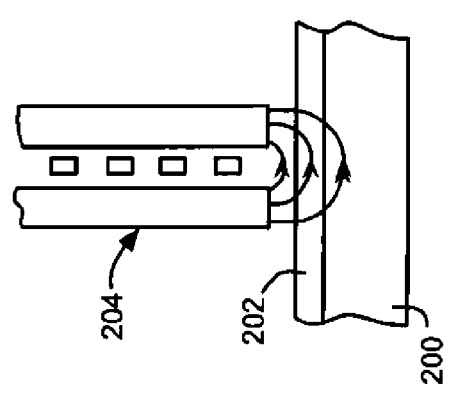

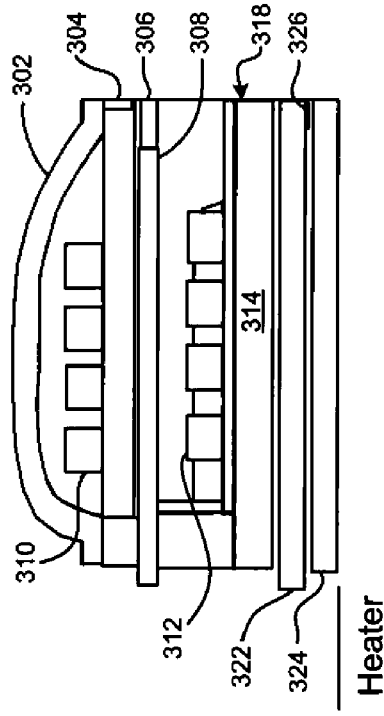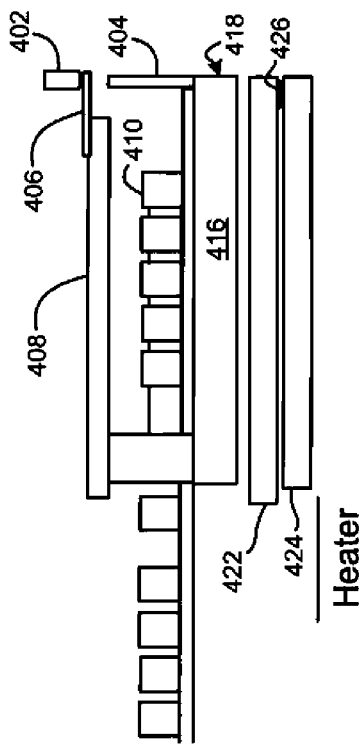
FIG. 3B
FIG. 4B
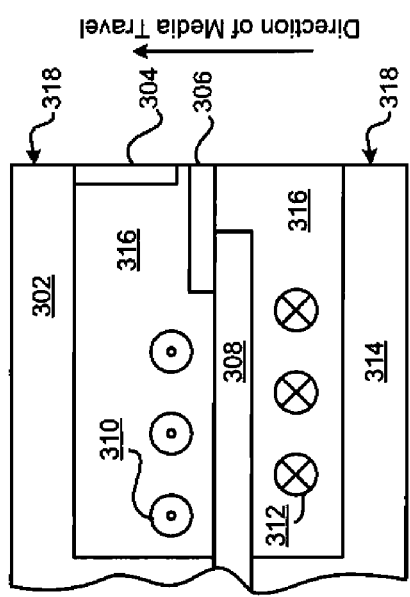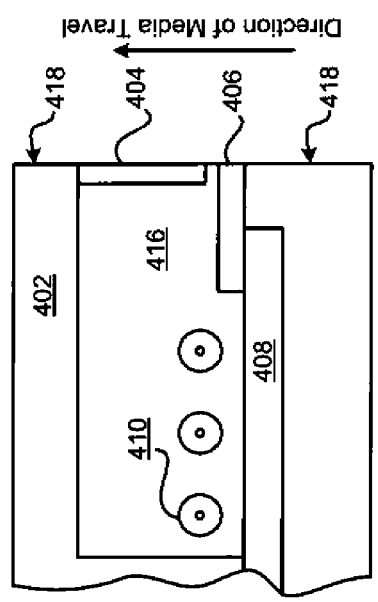
FIG. 3A
FIG. 4A

MICROWAVE-ASSISTED MAGNETIC RECORDING (MAMR) HEAD WITH HIGHLY RESISTIVE MAGNETIC MATERIAL

FIELD OF THE INVENTION

The present invention relates to data storage systems, and more particularly, this invention relates to microwave-assisted magnetic recording heads, and methods of production and use thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization and improvements to performance of the various components, however, presents its own set of challenges and obstacles.

In one approach, energy-assisted magnetic recording may be employed to produce a high magnetic recording density. In conventional microwave-assisted magnetic recording products and applications, the typical magnetic recording is based on superposing an assist magnetic field and a write magnetic field. In order to adequately improve the performance of MAMR products, each of the assist magnetic field characteristics and the write magnetic field characteristics may be enhanced.

In order for a large current to flow efficiently to a spin torque oscillator (STO) of a MAMR head, the back gap-side current path must be electrically insulated. With this in mind, alumina ($Al_2O_3$) is typically employed as the back gap material. However, because alumina is a non-magnetic material, the magnetic circuit of the recording head is magnetically separated in the vicinity of the back gap. This produces a marked increase in the magnetic circuit resistance in the back gap that precludes the write magnetic field from being efficiently generated from the main pole. Accordingly, conventional MAMR structures exhibit undesirably low responsivity of the write magnetic field to the recording current.

In other conventional perpendicular magnetic recording head structures, an FeCoNi alloy may be employed for the back gap. Table 1 shows a comparison of the electrical and magnetic characteristics when alumina is employed for the back gap and when a permalloy is employed for the back gap.

TABLE 1

Electric resistance of current path and response properties for conventional MAMR heads employing permalloy (FeCoNi) and $Al_2O_3$ back gap materials.

| Back gap material | Permalloy (FeCoNi) | $Al_2O_3$ |
|---|---|---|
| Resistance ($\Omega$) | $5 \times 10^{-4}$ | $5 \times 10^{17}$ |
| $\Delta Heff/\Delta I$ (Oe/A) | $2.4 \times 10^5$ | $1.9 \times 10^5$ |

These data refer to a conventional permalloy FeCoNi alloy defined by the composition $Fe_{80}Ni_{20}$. The electrical resistance when this permalloy is employed for the back gap is $5 \times 10^{-4} \Omega$, and the responsivity thereof is $2.4 \times 10^5$ Oe/A. The STO side resistance is $0.6\Omega$. Accordingly, because almost all the current flows along the current path on the back gap side, the STO does not oscillate and, no assist magnetic field is generated. Notably, because an equivalent resistivity and a saturation magnetic flux density of not less than 0.1 T is produced when FeCoNi alloys having a composition other than $Fe_{80}Ni_{20}$ are employed, this same conclusion may be drawn for permalloy-containing MAMR head structures, regardless of the specific composition.

As a result, there is little to no microwave-assisted effect produced during magnetic recording in typical structures employing permalloy as the back gap material.

On the other hand, in conventional MAMR head structures where alumina is employed for the back gap material, an electrical resistance of $5 \times 10^{17} \Omega$ and a responsivity of $1.9 \times 10^5$ Oe/A are produced. As a result of a marked increase in the magnetic circuit resistance in the back gap as described above, a write magnetic field cannot be efficiently generated by conventional MAMR head structures employing alumina as a back gap material.

Accordingly, the responsivity of the write magnetic field to the recording current is undesirably low in conventional MAMR head structures employing alumina as the back gap material. Moreover, a microwave-assisted magnetic recording head in which the write magnetic field responsivity is improved as much as with permalloy back gap materials, while avoiding the electrical insulation characteristics of the current path in the vicinity of alumina back gap materials would be highly desirable.

SUMMARY

In one embodiment, a high-frequency magnetic field-assisted magnetic recording (MAMR) head includes: a yoke adapted for facilitating magnetic flux through the MAMR head; a main pole magnetically coupled to the yoke and adapted for producing a writing magnetic field; a return pole spaced from the main pole; a spin torque oscillator (STO) positioned above the main pole; and a back gap layer positioned between the yoke and the return pole, wherein at least one of the yoke, the main pole, the return pole, and the back gap layer comprises a highly resistive magnetic material.

In another embodiment, a high-frequency magnetic field-assisted magnetic recording (MAMR) head includes: a reproducing portion comprising: a first sensor shield; a second sensor shield; and a sensor between the first sensor shield and the second sensor shield; and a recording portion positioned adjacent the reproducing portion, the recording portion comprising: a yoke adapted for facilitating magnetic flux through the MAMR head; a main pole positioned above the yoke and adapted for producing a writing magnetic field; a spin torque oscillator (STO) positioned above the main pole; an STO shield positioned above the STO; a return pole positioned above the STO shield; and a back gap layer positioned between the yoke and the return pole, the back gap layer comprising at least one highly resistive material selected from the group consisting of: $XFe_2O_4$, $RFe_5O_{12}$, Fe, Co, Ni, FeCoNi, iron oxides, nickel oxides, cobalt oxides and manganese oxides, wherein X is an element selected from the group consisting of: Mn, Co, Ni, Zn, Cu, Fe, and wherein R is a rare earth element, wherein at least two of the yoke, the return pole, the main pole and the STO shield comprise at least one highly resistive material, wherein the highly resistive material is characterized by a resistivity in a range from about 1 Ωm to about $1\times10^4$ Ωm, a saturation magnetic flux density of not less than about 0.1 T, and a thickness not less than about 10 nm, wherein during operation of the head, a current flowing through the back gap material flows along a first current path characterized by a resistivity in not less than $1\times10^{-3}$ Ωm, and wherein during operation of the head, a current flowing through the STO along a second current path is delivered to the STO with about 100% efficiency.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
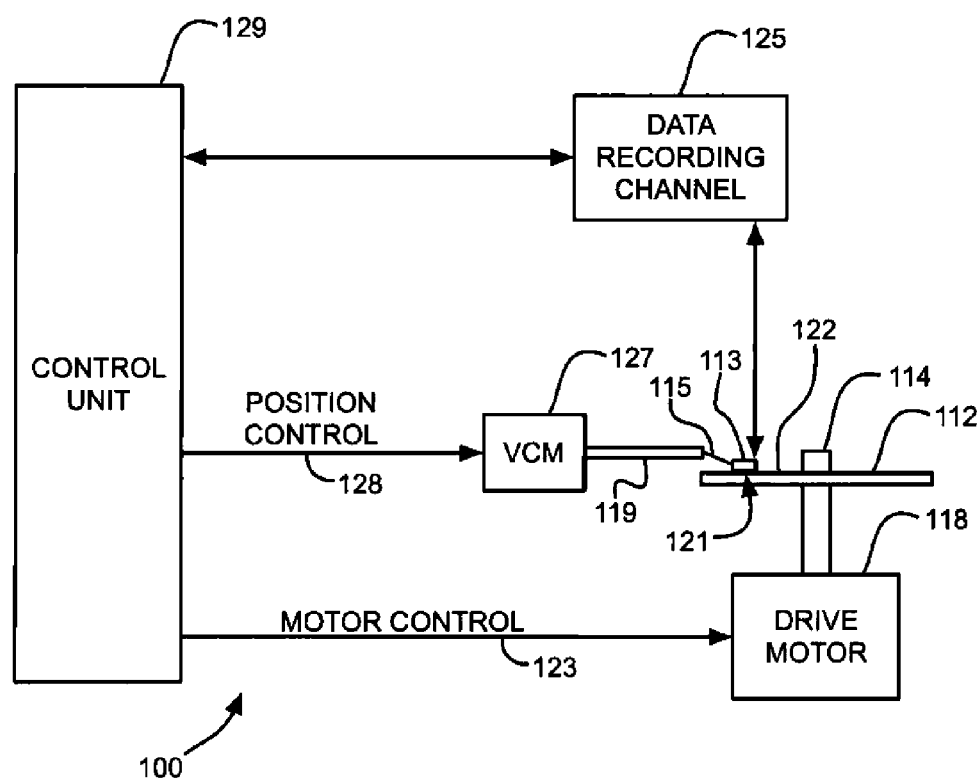
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a high-frequency magnetic field-assisted magnetic recording (MAMR) head includes: a yoke adapted for facilitating magnetic flux through the MAMR head; a main pole magnetically coupled to the yoke and adapted for producing a writing magnetic field; a return pole spaced from the main pole; a spin torque oscillator (STO) positioned above the main pole; and a back gap layer positioned between the yoke and the return pole, wherein at least one of the yoke, the main pole, the return pole, and the back gap layer comprises a highly resistive magnetic material.

In another general embodiment, a high-frequency magnetic field-assisted magnetic recording (MAMR) head includes: a reproducing portion comprising: a first sensor shield; a second sensor shield; and a sensor between the first sensor shield and the second sensor shield; and a recording portion positioned adjacent the reproducing portion, the recording portion comprising: a yoke adapted for facilitating magnetic flux through the MAMR head; a main pole positioned above the yoke and adapted for producing a writing magnetic field; a spin torque oscillator (STO) positioned above the main pole; an STO shield positioned above the STO; a return pole positioned above the STO shield; and a back gap layer positioned between the yoke and the return pole, the back gap layer comprising at least one highly resistive material selected from the group consisting of: $XFe_2O_4$, $RFe_5O_{12}$, Fe, Co, Ni, FeCoNi, iron oxides, nickel oxides, cobalt oxides and manganese oxides, wherein X is an element selected from the group consisting of: Mn, Co, Ni, Zn, Cu, Fe, and wherein R is a rare earth element, wherein at least two of the yoke, the return pole, the main pole and the STO shield comprise at least one highly resistive material, wherein the highly resistive material is characterized by a resistivity in a range from about 1 am to about $1\times10^4$ $\Omega$m, a saturation magnetic flux density of not less than about 0.1 T, and a thickness not less than about 10 nm, wherein during operation of the head, a current flowing through the back gap material flows along a first current path characterized by a resistivity in not less than $1\times10^{-3}$ $\Omega$m, and wherein during operation of the head, a current flowing through the STO along a second current path is delivered to the STO with about 100% efficiency.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

PRIOR ART

Figure 5:
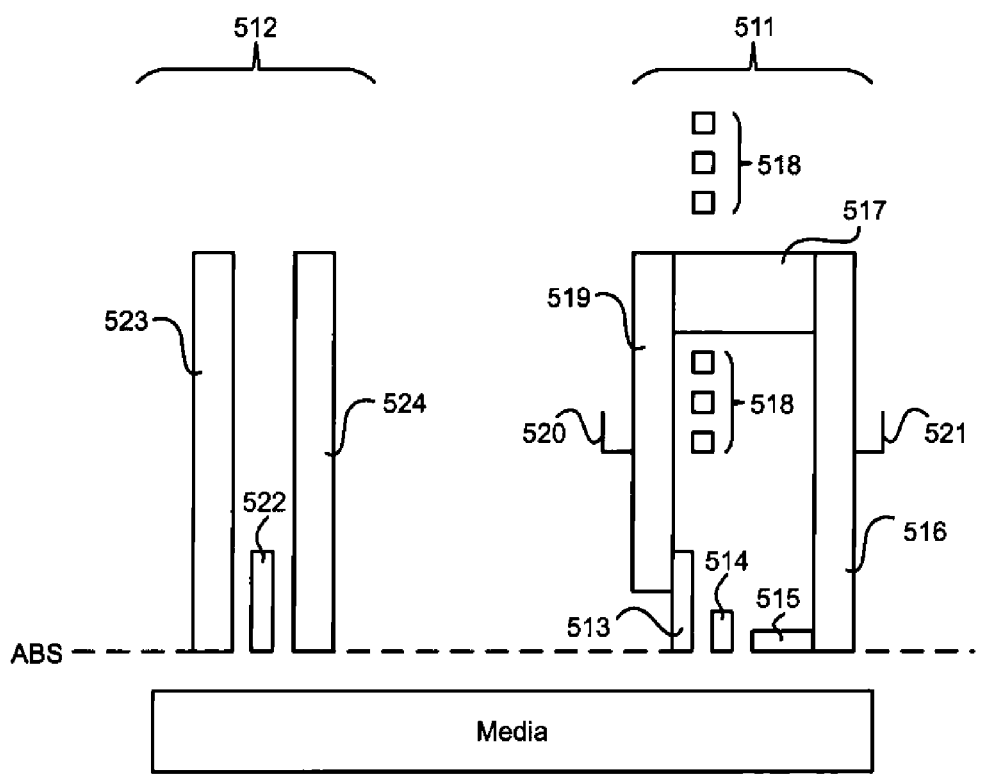
FIG. 5 depicts a schematic image of a microwave-assisted magnetic recording head, according to one embodiment.

FIG. 5 shows a conventional structure of a MAMR head. The conventional magnetic head consists of a recording head portion 511 and a reproducing head portion 512. The recording head portion 511 is characterized by having, a main pole 513, a spin torque oscillator (STO) 514, a STO shield 515, a return pole 516, a back gap 517, a coil 518, a yoke 519, a lower electrode 520 and an upper electrode 521, while the reproducing head portion 512 is characterized by having a reproducing sensor 522 such as a CIP-GMR sensor, a CPP-GMR sensor or a TMR sensor, according to the prior art. Moreover, a lower reproducing shield 523 and an upper reproducing shield 524 are positioned flanking the reproducing sensor 522 in the conventional MAMR head structure, as can be seen from FIG. 5.

Figure 6:
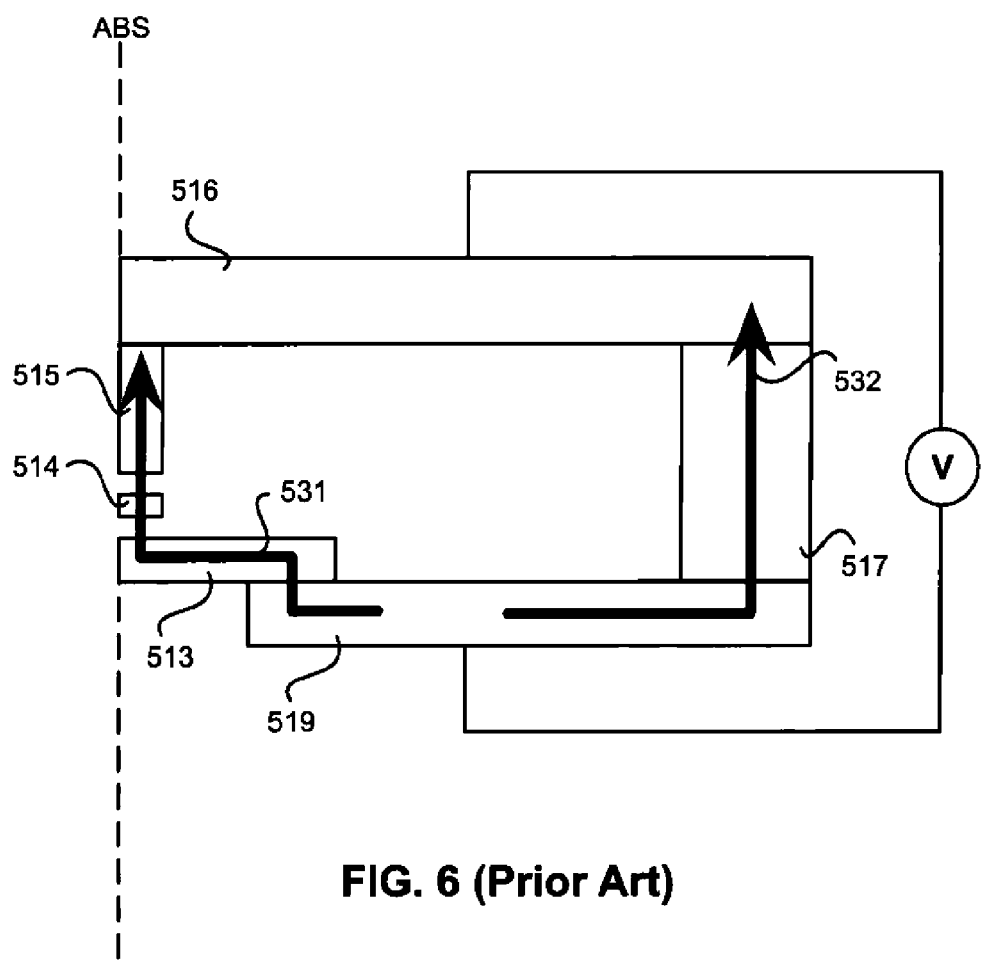
FIG. 6 depicts a schematic image of current paths in microwave-assisted magnetic recording head, according to one embodiment. The image is rotated and reversed from the view shown in FIG. 5.

FIG. 6 depicts the conventional structure shown in FIG. 5 in operation from a view rotated 90° to the right and inverted along an axis perpendicular to the air-bearing surface (ABS), according to the prior art. During a recording operation, such as a write operation targeting a portion of a magnetic medium, current flows through two paths in the MAMR head. In particular, a first current flows through a first current path 532 from the yoke 519, through the back gap 517 and into the return pole 516. In addition, a second current flows through a second current path 531 through the yoke 519 to the main pole 513, the STO 514, and the STO shield 515 into the return pole 516, according to the prior art.

DESCRIPTION OF INVENTIVE EMBODIMENTS

According to the inventive embodiments described herein, a highly resistive material is disposed in at least one part of a magnetic circuit including a main pole, return pole, yoke and a back gap. The inventive structure advantageously improves the write magnetic field responsivity while allowing a large current to flow efficiently to the STO. In some approaches, a microwave-assisted recording head also includes a structure in which an STO is laminated between the main pole and a STO shield. FIGS. 7-12 depict the highly resistive material 716 at various locations in the magnetic circuit.

Preferably, the head is adapted for recording information on a magnetic medium by a process involving using the main pole as one electrode and the STO shield as another electrode for a STO. In operation, the flow of a current to the STO enclosed between the main pole and shield generates a microwave magnetic field. Moreover, superposing this microwave magnetic field and the magnetic field from the main pole results in improved write magnetic field responsivity while allowing efficient flow of high current to the STO.

In some embodiments, the highly resistive magnetic material is characterized by a resistivity of not less than $10^{-3}$ Ωm. In one embodiment, the resistivity is in a range of approximately $10^{-3}$ Ωm to 1 Ωm, in a preferred embodiment a range of about $10^2$ Ωm to $10^3$ Ωm, and in a particularly preferred embodiment a range of approximately $10^3$ Ωm to $10^4$ Ωm. Of course, other ranges of resistivity may be employed without departing from the scope of the present invention, as would be understood by one having ordinary skill in the art upon reading the present descriptions.

Moreover, the saturation magnetic flux density of this highly resistive material is desirably not less than 0.1 T. In some embodiments, the flux density may be greater than about 1 T, in others greater than about $10^2$ T, and in still others greater than about $10^4$ T, as will be appreciated by skilled artisans upon reading the present descriptions.

In addition, the thickness of the head portion(s) in which the highly resistive material is employed is desirably not less than 10 nm, although head portions with highly resistive material therein and a thickness more than or less than 10 nm may be employed without departing from the scope of the present disclosures.

Particularly preferred embodiments employ ferrite (an Fe oxide) as the highly resistive material 716. As understood herein, ferrite is a ferric oxide which may be defined by a composition of $XFe_2O_4$ where X is an element such as Mn, Co, Ni, Zn, Cu, Fe, etc., as would be understood by the skilled artisan upon reading the present descriptions. Alternatively, the ferrite may be a ferric oxide defined by a composition of $RFe_5O_{12}$, where R is a rare earth element.

Additionally and/or alternatively, a granular magnetic material may be used as the highly resistive material 716. As understood herein, a granular magnetic material is preferably characterized by having small magnetized particles such as Fe, Co, Ni, FeCoNi alloy, ferrite, etc. disposed in a non-magnetic insulator material such as $Al_2O_3$, MgO, $SiO_2$, etc. and/or oxides containing Ni, Co, Mn or Fe etc., as would be understood by one having ordinary skill in the art upon reading the present descriptions.

Furthermore, in some approaches a structure comprising the highly resistive material 716 may be formed by laminating at least one layer of each of an FeCoNi alloy and any of the highly resistive material 716 as noted above, and the laminate structure may be employed as the highly resistive material 716. According to one embodiment, the thickness of the highly resistive material 716 of this laminate structure is not less than 10 nm.

In preferred approaches, the highly resistive material 716 is disposed for use as the back gap. According to one embodiment, the back gap may be constituted in its entirety from the highly resistive material 716, or it may be partially constituted therefrom.

Figure 7:
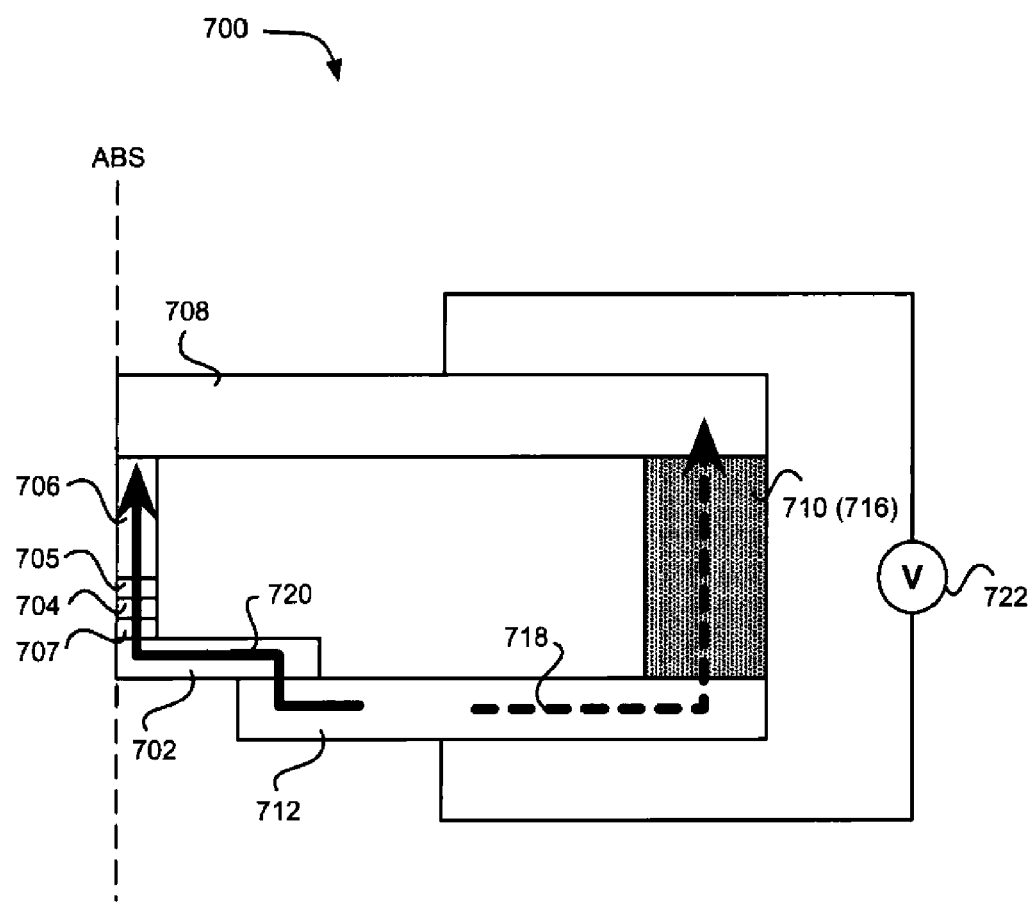
FIG. 7 depicts a microwave-assisted magnetic recording head with ferrite back gap, according to one embodiment.

FIG. 7 shows the structure of one exemplary inventive embodiment. The inventive magnetic head includes a recording head portion 700, and may include a reproducing head portion (not shown). As an option, the present structure 700 may be implemented in conjunction with features from any other embodiment listed herein, such as those described with reference to the other FIGS. Of course, however, such structure 700 and others presented herein may be used in various applications and/or in permutations which may or may not be specifically described in the illustrative embodiments listed herein. Further, the structure 700 presented herein may be used in any desired environment.

The recording head portion 700 is characterized by having, a main pole 702, a spin torque oscillator (STO) 704, a STO shield 706, a return pole 708, a back gap 710, a coil (not shown), a yoke 712, a lower electrode (not shown) and an upper electrode (not shown). A nonmagnetic, electrically conductive material or materials 705, 707 of any known type, including materials conventionally used in a write gap, may be positioned between the STO and the main pole 702, as well as between the STO 704 and shield 706. A current source 722 of known type for powering the STO 704 may be coupled to portions of the recording head portion 700, such as the return pole 708 and yoke 712. Parameters such as voltage, current level, etc. of the current source 722 may be selected according to knowledge generally available to those skilled in the art.

The reproducing head portion, if present, may be characterized by having a reproducing sensor (not shown) such as a CIP-GMR sensor, a CPP-GMR sensor or a TMR sensor, according to one embodiment. Moreover, a lower reproducing shield (not shown) and an upper reproducing shield (not shown) are positioned flanking the reproducing sensor (not shown).

Additional elements not shown in FIG. 7 and in other embodiments may be present, such as those found in FIG. 5. Such additional elements may be arranged in a substantially similar fashion as shown in FIG. 5, in various embodiments.

In one embodiment, the recording portion may be positioned directly adjacent the reproducing portion, and in other embodiments the recording portion may be spaced from the reproducing portion, as would be understood by one having ordinary skill in the art upon reading the present descriptions.

In preferred approaches, a highly resistive material 716 as described herein may be employed for the back gap layer 710. In particularly preferred embodiments, the highly resistive material 716 is ferrite. In one exemplary embodiment, when viewed from a perspective as shown in FIG. 7 the back gap layer may be characterized by an area of approximately 21 μm, defined by a height in a plane of deposition of about 7 μm and a width in the plane of deposition of about 3 μm. Moreover, in some approaches the back gap thickness (into the page as viewed from the perspective shown in FIG. 7) is not less than about 1 μm.

Figure 13:
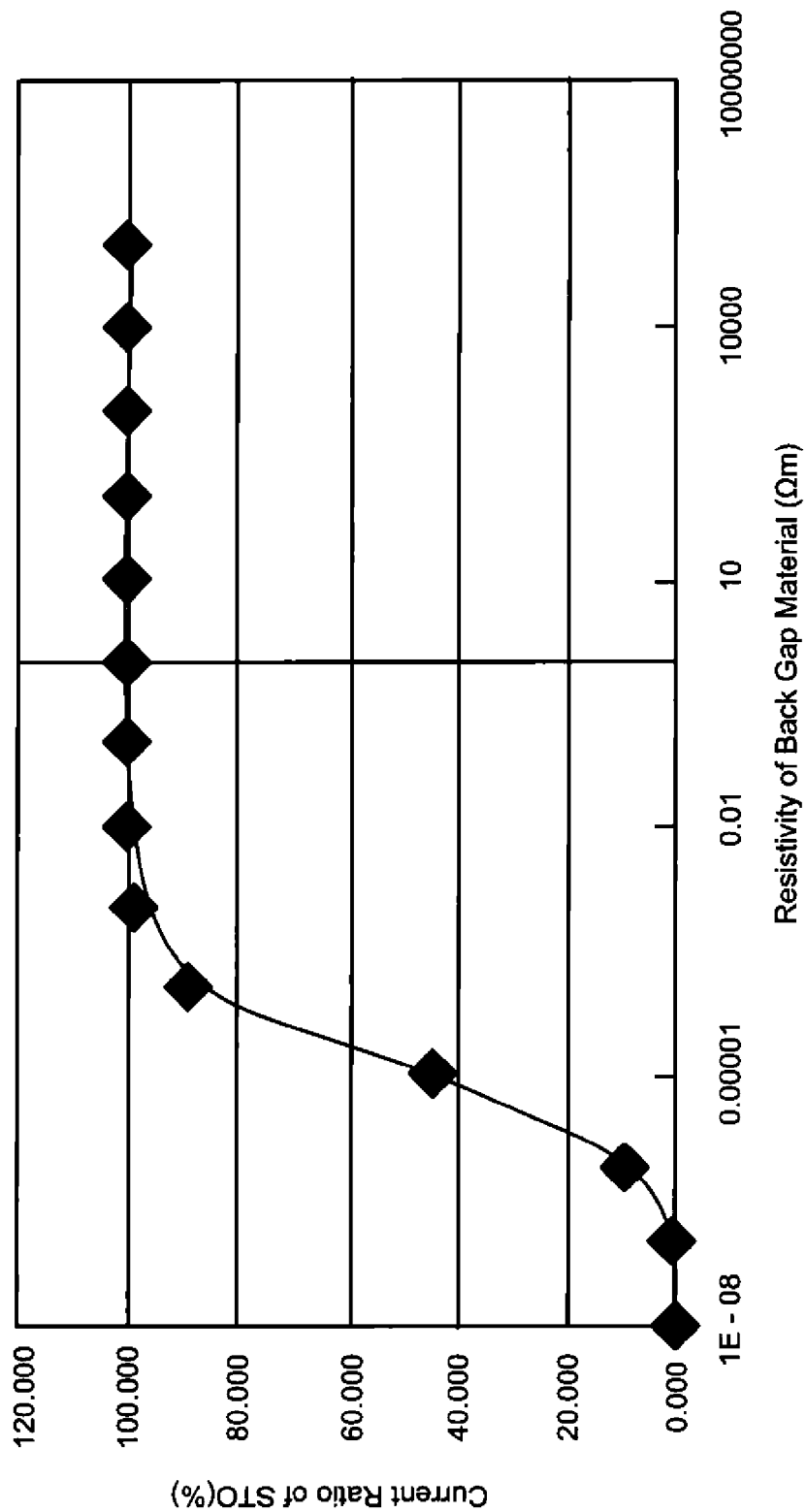
FIG. 13 depicts a STO current ratio as a function of resistivity of back gap material, according to one embodiment.

FIG. 13 shows the effect that the resistivity of the highly resistive material has on the ratio of the current flowing to the STO to the total current. In the experimental results discussed below, the resistance was calculated employing these values. The general embodiment shown in FIG. 7 as a representation of components used in the following discussion of experimentation. During experimentation, it was discovered that, in order for a large current to flow efficiently along the second current path 720 to the STO 704 without a concurrent flow along the first current path 718 into the back gap 710, the resistance of the first current path may be increased.

As determined experimentally, the STO side resistance was about 0.6Ω in various embodiments. Thus, in order for a large current to flow efficiently to the STO side (second current path), the resistance of the first current path is preferably suitably higher than this value of 0.6Ω. In particularly preferred embodiments, a suitable resistance of the first current path may be achieved by employing a highly resistive material 716 in the back gap 710 characterized by a resistivity of no less than about $10^{-3}$ Ωm. By employing such a highly resistive material in the back gap 710, preferred embodiments of the inventive MAMR head may achieve excellent, and preferably substantially perfect, efficiency in delivering current to the STO 704. In other words, by employing a highly resistive material 716 in the back gap 710 characterized by a resistivity of no less than about $10^{-3}$ Ωm, one may achieve near 100% efficiency in delivering current to the STO 704 along the second current path 720, as can be seen from the experimental results shown in FIG. 13. In some embodiments, the current may flow along the second current path with about 99% efficiency, in preferred embodiments with about 99.9% efficiency, and in particularly preferred embodiments with about 99.99% efficiency.

Moreover, the use of a highly resistive material 716 having a thickness of about 1 nm in the back gap 710 may generate a tunnel current according to one embodiment that results in an undesirable drop in the resistance of the back gap 710. Accordingly, the thickness of the highly resistive material 716 in the back gap is preferably at least a thickness at which the generation of a tunnel current is avoided. In some approaches, a thickness of the order of about 10 nm is sufficient to avoid the undesirable drop in resistance caused by tunnel current.

One particularly effective approach to achieve suitable resistance along the first current path 718 is to employ ferrite as the highly resistive material 716 in the back gap 710. According to one embodiment where ferrite is disposed in the back gap 710, experimental results revealed that the resistivity of the ferrite was about $10^4$ Ωm, and correspondingly the resistance along the first current path 718 was about $5 \times 10^8$ Ω. This is several orders of magnitude higher than the exemplary 0.6 μΩ resistance of the STO 704, and is a sufficiently high electrical resistance to achieve near-perfect (i.e. 100% efficient) current delivery to the STO 704.

Additionally and/or alternatively, in some approaches a granular magnetic material may be used as the highly resistive material 716 in the back gap 710. As will be appreciated by the skilled artisan reading the present descriptions, the magnetic material in the grains confers the magnetic properties of a granular magnetic material. Accordingly, the magnetic permeability thereof is greater than in a vacuum, and as a result the magnetic circuit resistance is reduced. In addition, because a non-magnetic insulator interrupts the current-conducting path along a granular magnetic material, the resistivity is concurrently higher than in uniform materials. In some approaches, the granular magnetic material therefore forms a highly resistive material 716 and affords an effect similar to ferrite.

Additionally and/or alternatively, a compound having strong magnetism at room temperature may be employed as the highly resistive material 716. In some embodiments, oxides containing Mn, Co, Ni, Fe, etc., as would be understood by one having ordinary skill in the art upon reading the present descriptions, may be employed as the highly resistive material 716.

Furthermore, materials constructed by the lamination of a highly resistive material 716 and a magnetic alloy such as a FeCoNi alloy may be employed as the highly resistive material 716 in the back gap 710.

FIGS. 7-12 show various embodiments of the inventive magnetic head as described herein having a highly resistive material 716 disposed in one or more elements of the recording portion 700 so as to generate the desirable high resistance along a first current path 718 and responsivity along a second current path 720. As will be appreciated by the skilled artisan upon reading the present descriptions, the various embodiments are not mutually exclusive, and may be combined in any fashion desirable to improve performance of a MAMR head by including highly resistive material 716 in any combination of the main pole 702, the STO shield 706, the return pole 708, the yoke 712 and/or the back gap 710.

Figure 8:
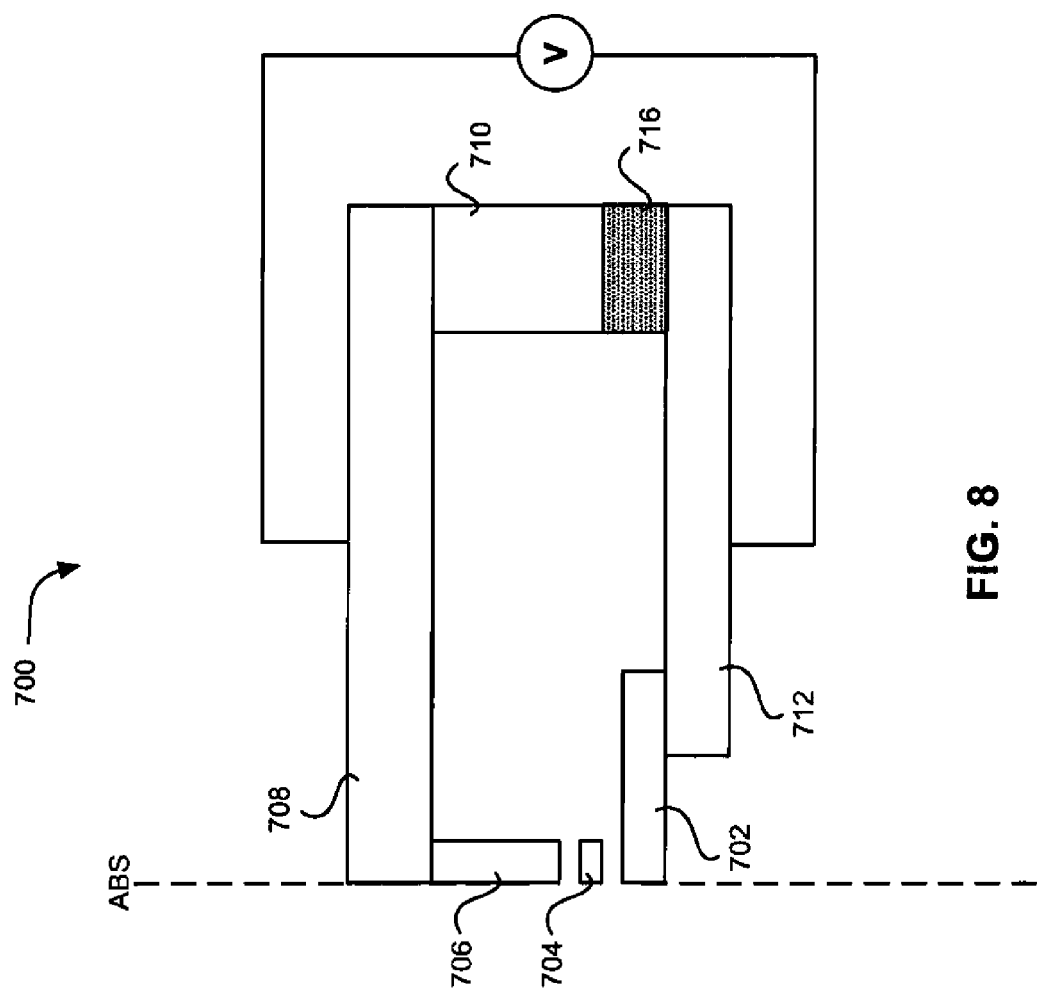
FIG. 8 depicts a microwave-assisted magnetic recording head comprising ferrite in a portion of the back gap, according to one embodiment.

As shown in FIG. 8, a similar advantage in resistance and responsivity is produced when a highly resistive material 716 is employed in only a portion of the back gap. According to one embodiment seen in FIG. 8, the back gap 710 may comprise a highly resistive material 716 and an additional material. As will be understood by the skilled artisan reading the present descriptions, the additional material may be any material suitable for use in a back gap 710 of a MAMR head, including those conventionally used for such purpose.

Figure 9:
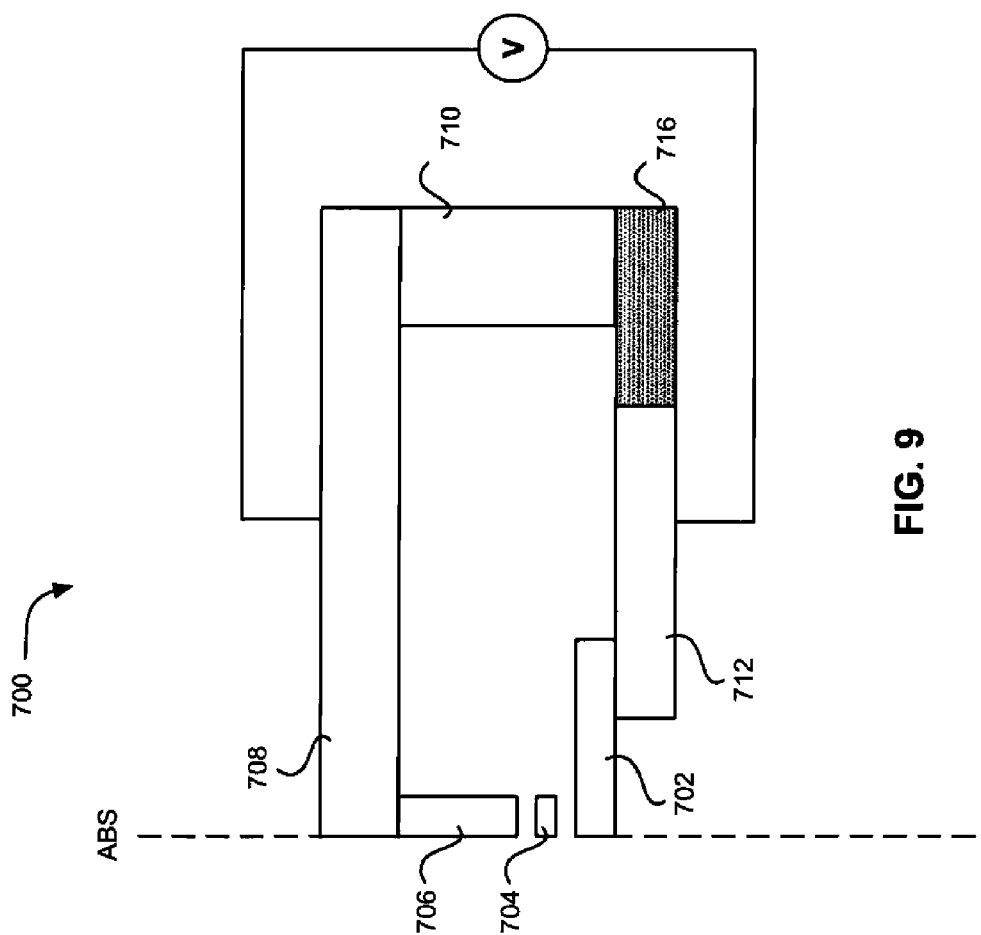
FIG. 9 depicts a microwave-assisted magnetic recording head comprising ferrite in the yoke, according to one embodiment.

As shown in FIG. 9, in other embodiments a highly resistive material 716 may be disposed in all or part of the yoke 712 to confer the desirably high resistance and responsivity on the resulting MAMR head.

Additionally and/or alternatively, the employment of a highly resistive material 716 in a part of the STO shield 706 affords a similar effect.

Figure 10:
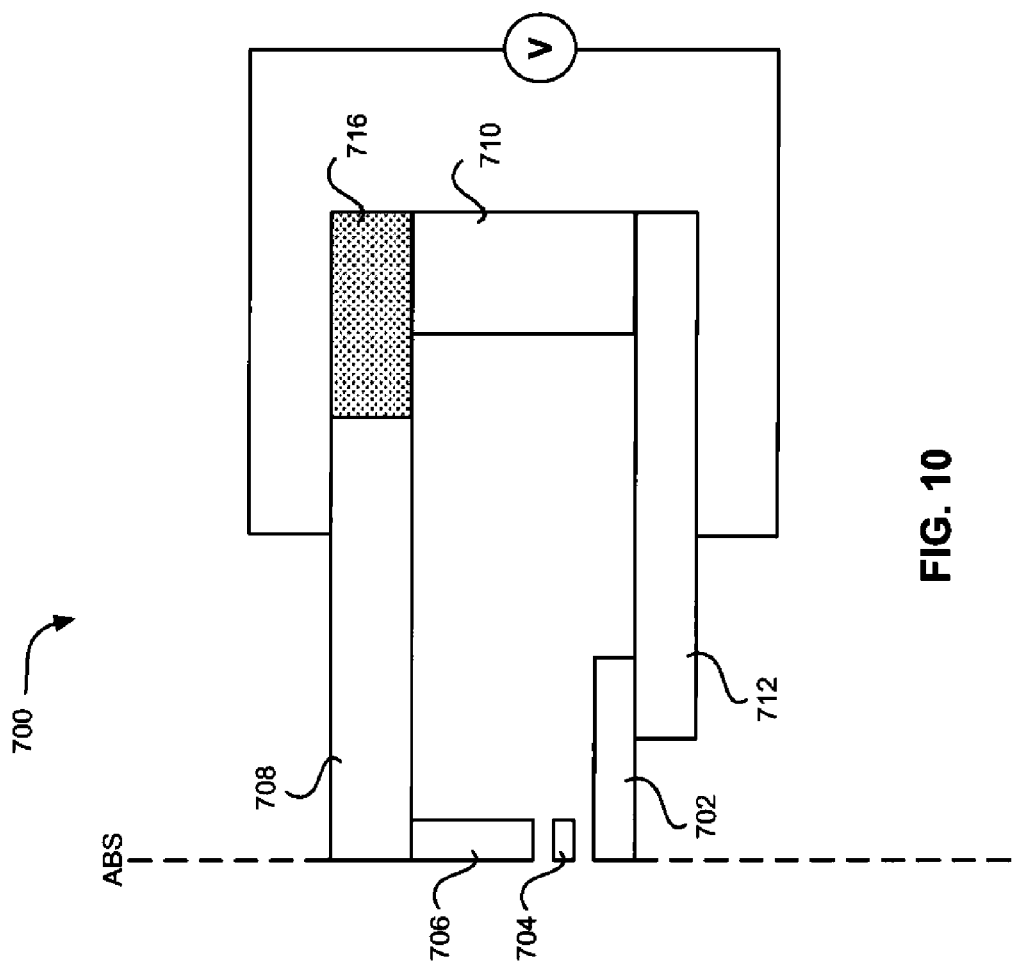
FIG. 10 depicts a microwave-assisted magnetic recording head comprising ferrite in the return pole, according to one embodiment.

In addition, as shown in FIG. 10, the employment of a highly resistive material 716 in a part of the return pole 708 affords the same effect.

Figure 11:
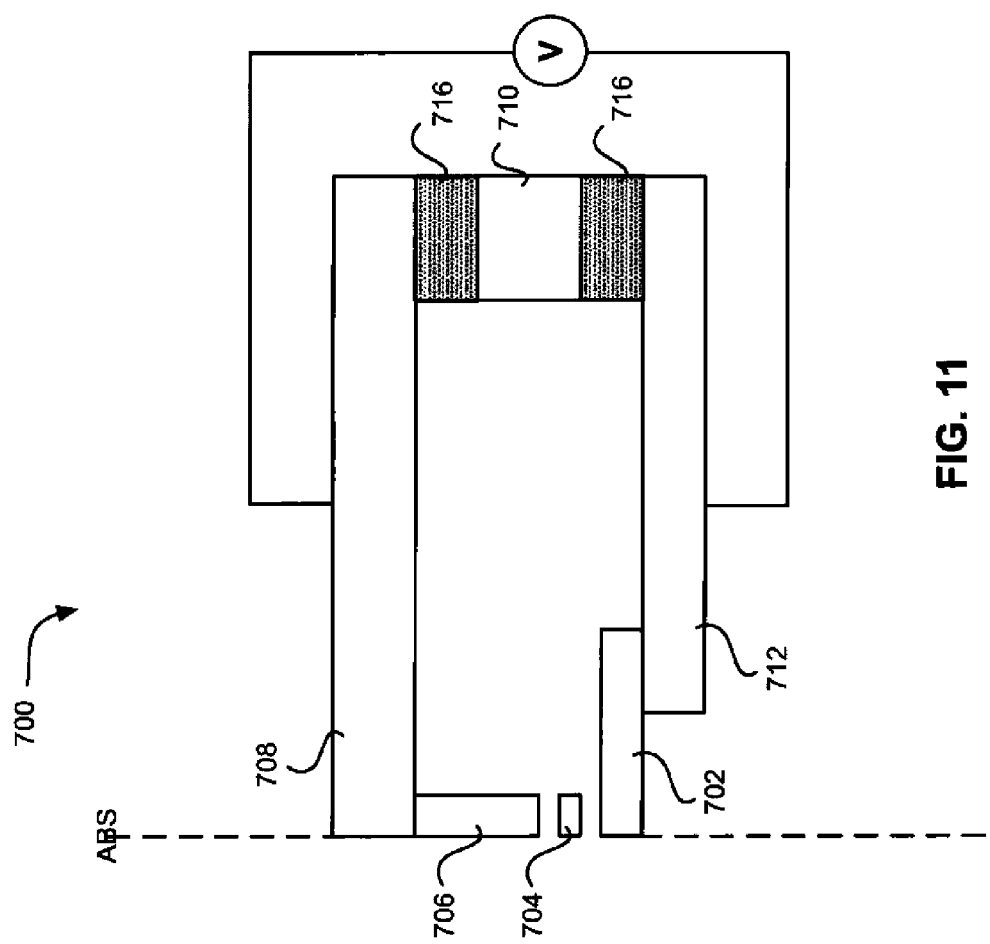
FIG. 11 depicts a microwave-assisted magnetic recording head with a laminated back gap, according to one embodiment.

In addition, as shown in FIG. 11, the back gap 710 may be constituted from the lamination of a highly resistive material 716 and a magnetic material such as a FeCoNi alloy.

Figure 12:
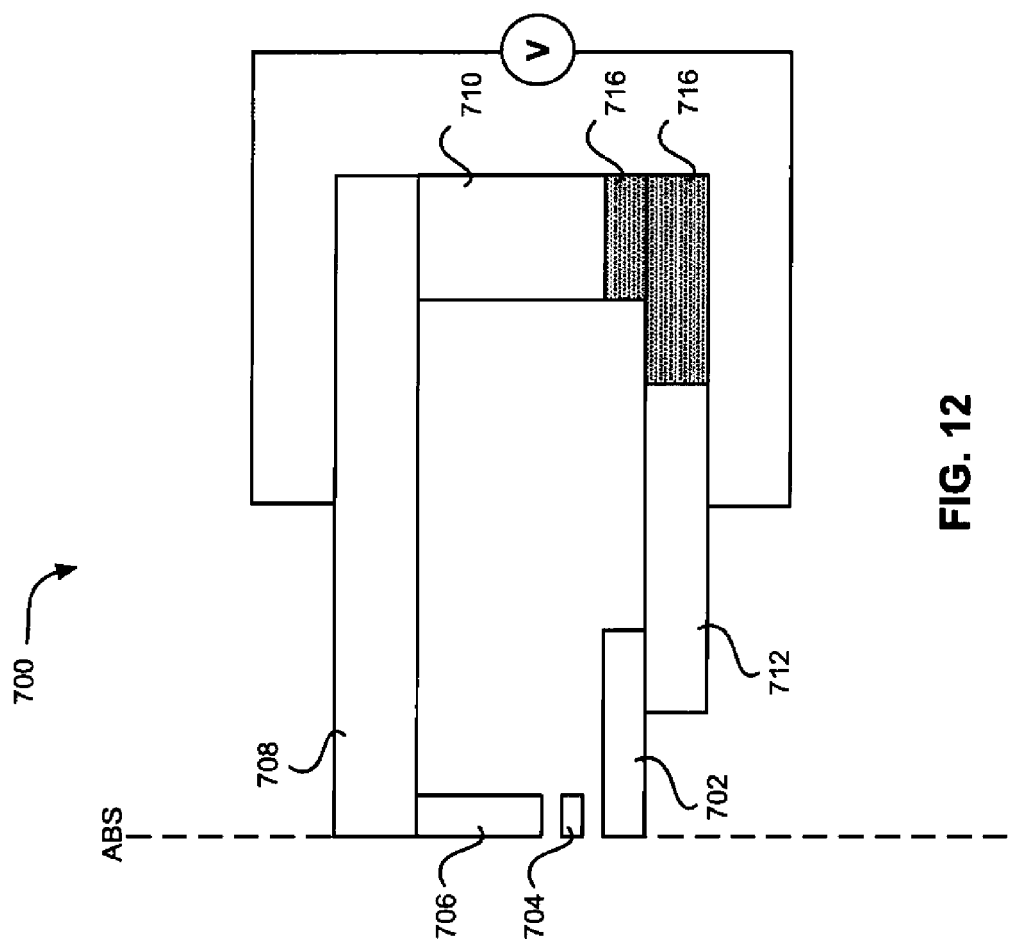
FIG. 12 depicts a microwave-assisted magnetic recording head having ferrite in the back gap and the yoke, according to one embodiment.

Furthermore, as represented in FIG. 12, the arrangement of highly resistive material 716 in two or more of the main pole 702, the STO shield 706, the return pole 708, the yoke 712 and/or the back gap 710 of the magnetic circuit affords similarly effective improvements to MAMR head performance.

Notably, in embodiments where one or more portions of the main pole 702, the STO shield 706, the return pole 708, the yoke 712 and/or the back gap 710 do not employ a highly resistive material 716 as described herein, an additional material such as FeCoNi alloy may be employed.

The adoption of the inventive configurations described herein ensures an adequately advantageous increase in the resistance of a first current path 718, e.g. a resistance of about $10^{-3} \Omega$ or more, as would be appreciated by the skilled artisan reading the present descriptions. In turn, this large resistance ensures that large amounts of current flow with near-perfect efficiency (i.e. about 100% efficiency) to the STO 704 along the second current path 720. Moreover, this configuration enables concurrent reduction in the magnetic circuit resistance along the first current path 718. This ultimately results in a microwave-assisted magnetic recording head that possesses a high write magnetic field responsivity while maintaining the efficient flow of a large current to the STO.

The employment of a ferrite in the back gap of a microwave-assisted magnetic recording head in this way allows a large current to be efficiently applied to the spin torque oscillator in the absence of the flow of current to the back portion, and improves the current responsivity of the recording head magnetic field.

Figure 16:
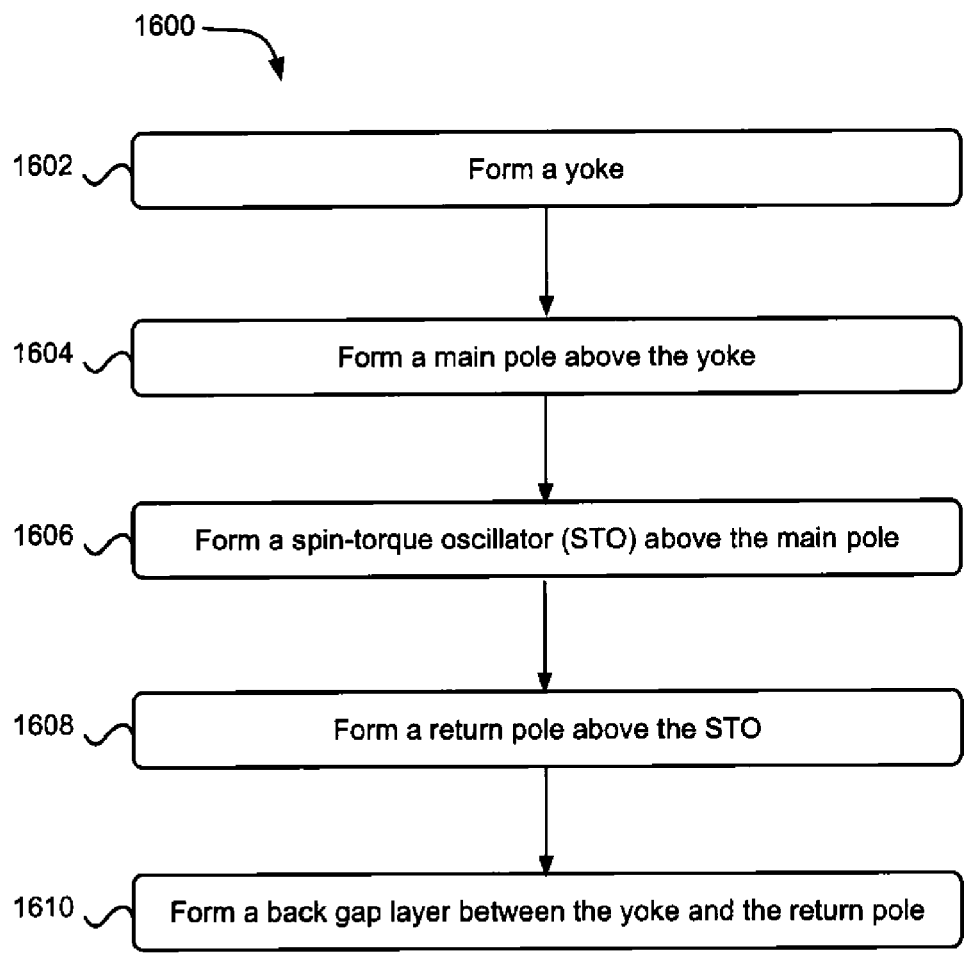
FIG. 16 depicts a flowchart of a method, according to one embodiment.

As described herein, according to some approaches the inventive MAMR head structure may be produced by following a process such as method 1600, depicted in FIG. 16. As will be appreciated by one having ordinary skill in the art upon reading the present descriptions, method 1600 may be performed in any environment, including but not limited to those depicted in FIGS. 1-12, among others.

In one embodiment, method 1600 includes operation 1602 where a yoke, such as yoke 712, is formed. The yoke may be formed by any suitable method, including but not limited to sputtering, chemical vapor deposition, ion beam deposition, etc. as would be appreciated by one having ordinary skill in the art upon reading the present descriptions. Moreover, the yoke may include a highly resistive material 716 in some approaches, but need not have such a composition to achieve the inventive MAMR head.

In operation 1604, a main pole, such as main pole 702 may be formed above the yoke. The main pole may be formed by any suitable method, including but not limited to sputtering, chemical vapor deposition, ion beam deposition, etc. as would be appreciated by one having ordinary skill in the art upon reading the present descriptions. Moreover, the main pole may include a highly resistive material 716 in some approaches, but need not have such a composition to achieve the inventive MAMR head.

In operation 1606, a spin torque oscillator (STO) such as STO 704 may be formed above the main pole. The STO may be formed by any suitable method, including but not limited to sputtering, chemical vapor deposition, ion beam deposition, etc. as would be appreciated by one having ordinary skill in the art upon reading the present descriptions.

In one approach an operation 1608 may be performed by forming a return pole such as return pole 708 above the STO. The return pole may be formed by any suitable method, including but not limited to sputtering, chemical vapor deposition, ion beam deposition, etc. as would be appreciated by one having ordinary skill in the art upon reading the present descriptions. Moreover, the return pole may include a highly resistive material 716 in some approaches, but need not have such a composition to achieve the inventive MAMR head.

In some approaches, a back gap such as back gap 710 may be formed between the yoke and the return pole in operation 1610. The back gap may be formed by any suitable method, including but not limited to sputtering, chemical vapor deposition, ion beam deposition, etc. as would be appreciated by one having ordinary skill in the art upon reading the present descriptions. Moreover, the back gap may include a highly resistive material 716 in some approaches, but need not have such a composition to achieve the inventive MAMR head.

Experimental Results

Turning now to the operation and functionality of the inventive MAMR head as described herein, FIG. 13 shows a STO current ratio as a function of resistivity of back gap material, according to one embodiment. A person having ordinary skill in the art will appreciate from reviewing the present disclosures, and particularly the data shown in FIG. 13 that, for MAMR heads having a resistance of about $10^4$ Ωm along the first current path 718 (e.g., as represented in FIG. 7), essentially 100% of the current flows to the STO along the second current path 720 (e.g., as represented in FIG. 7). Since ferrite as described herein exhibits a resistivity well above this threshold when arranged in one or more elements of a MAMR head according to the inventive embodiments described above, sufficient electrical insulation characteristics are maintained in the first current path to confer the advantage of superior high-efficiency current flow to the STO as compared to current flow efficiency of conventional MAMR head structures.

Figure 14:
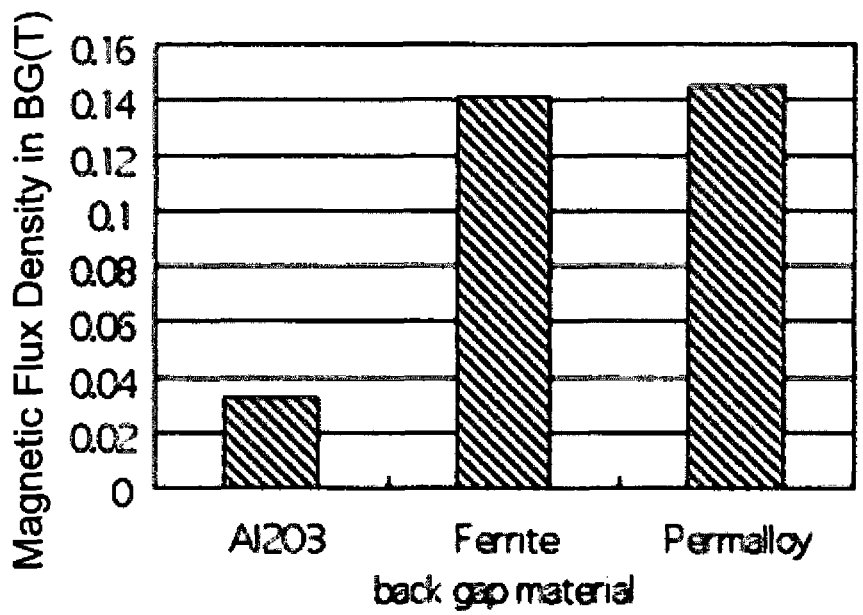
FIG. 14 depicts a magnetic flux density in back gap for $Al_2O_3$, Ferrite and permalloy, according to one embodiment.

FIG. 14 shows the saturation magnetic flux density in the back gap as calculated using the finite element magnetic field method. While the magnetic flux density using alumina was found to be of the order of about 0.03 T, the magnetic flux density of the permalloy was found to be of the order of about 0.14 T. This difference in magnetic flux density is due to the magnetization of the permalloy, and this indicates that the saturation magnetic flux density of the magnetic material of the back gap is desirably not less than about 0.1 T. The saturation magnetic flux density as calculated for the ferrite was about 0.2 T—a comparatively much larger figure than 0.1 T. When a ferrite was employed for the back gap, the magnetic flux density of the back gap was found to be about 0.14 T.

Figure 15:
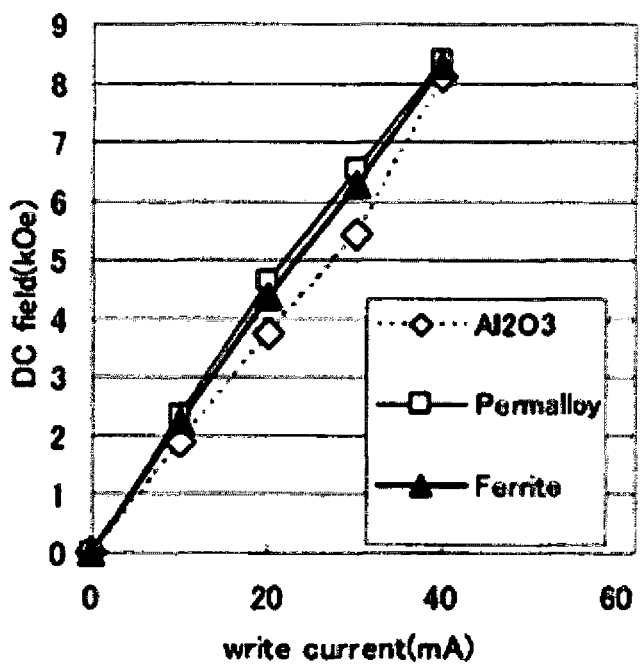
FIG. 15 depicts a write current dependence of the write field, according to one embodiment.

FIG. 15 shows the dependency of the recording head magnetic field (Heff) as calculated using the finite element magnetic field calculation with respect to a recording head current (Iw). As can be seen from the experimental results, a back gap in which ferrite is employed generates a higher recording head magnetic field with respect to the recording current than a head in which alumina is employed in the back gap. Without wishing to be bound to any particular theory, the inventors believe this difference is due to the magnetic coupling of the back gap and the reduction of the magnetic circuit resistance in the back gap portion. In one embodiment, the current responsivity (ΔHeff/ΔIw) may be improved by about 20% by changing the back gap material from $Al_2O_3$ to a ferrite in this way.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A high-frequency magnetic field-assisted magnetic recording (MAMR) head, comprising:
    a yoke adapted for facilitating magnetic flux through the MAMR head;
    a main pole magnetically coupled to the yoke and adapted for producing a writing magnetic field;
    a return pole spaced from the main pole;
    a spin torque oscillator (STO) positioned above the main pole; and
    a back gap layer positioned between the yoke and the return pole,
    wherein at least one of the yoke, the main pole, the return pole, and the back gap layer comprises a highly resistive magnetic material.

2. The head as recited in claim 1, wherein the highly resistive magnetic material comprises a material selected from the group consisting of: $XFe_2O_4$, $RFe_5O_{12}$, Fe, Co, Ni, FeCoNi, iron oxides, nickel oxides, cobalt oxides and manganese oxides;
    wherein X is an element selected from the group consisting of: Mn, Co, Ni, Zn, Cu, Fe, and
    wherein R is a rare earth element.

3. The head as recited in claim 1, wherein the highly resistive material is characterized by a resistivity of not less than about $1 \times 10^{-3}$ Ωm.

4. The head as recited in claim 1, wherein the highly resistive material is characterized by a resistivity of about $1 \times 10^4$ Ωm.

5. The head as recited in claim 4, wherein the highly resistive material is further characterized by a saturation magnetic flux density of not less than about 0.1 T.

6. The head as recited in claim 5 wherein the highly resistive material is further characterized by a thickness not less than about 10 nm.

7. The head as recited in claim 1, wherein the back gap layer consists of the highly resistive material.

8. The head as recited in claim 1, wherein the yoke comprises the highly resistive material.

9. The head as recited in claim 1, wherein the return pole comprises the highly resistive material.

10. The head as recited in claim 1, further comprising a shield positioned between the STO and the return pole, the shield comprising the highly resistive material.

11. The head as recited in claim 1, further comprising a shield positioned between the STO and the return pole,
    wherein two or more of the yoke, the return pole, the main pole and the shield comprise the highly resistive material.

12. The head as recited in claim 1, wherein the highly resistive material is either $XFe_2O_4$ or $RFe_5O_{12}$,
    wherein X is an element selected from the group consisting of: Mn, Co, Ni, Zn, Cu, Fe, and
    wherein R is a rare earth element.

13. The head as recited in claim 1, wherein the highly resistive material is a granular magnetic material selected from the group consisting of: Fe, Co, Ni, FeCoNi, iron oxides, nickel oxides, cobalt oxides and manganese oxides.

14. The head as recited in claim 1, wherein during operation of the head, a current flowing through the back gap material flows along a first current path characterized by a resistance in the range from about $1 \times 10^8$ Ω to about $1 \times 10^9$ Ω.

15. The head as recited in claim 1, wherein during operation of the head, a current flowing through the STO along a second current path is delivered to the STO with about 100% efficiency.

16. A magnetic data storage system, comprising:
    at least one head as recited in claim 1;
    a magnetic medium;
    a drive mechanism for passing the magnetic medium over the at least one head; and
    a controller electrically coupled to the at least one head for controlling operation of the at least one head.

17. A method for forming the head as recited in claim 1, comprising:
    forming the yoke;
    forming the main pole above the yoke;

forming the STO above the main pole;
forming the return pole above the STO; and
forming the back gap layer between the yoke and the return pole.

18. A high-frequency magnetic field-assisted magnetic recording (MAMR) head, comprising:
a reproducing portion comprising:
a first sensor shield;
a second sensor shield; and
a sensor between the first sensor shield and the second sensor shield; and
a recording portion positioned adjacent the reproducing portion, the recording portion comprising:
a yoke adapted for facilitating magnetic flux through the MAMR head;
a main pole positioned above the yoke and adapted for producing a writing magnetic field;
a spin torque oscillator (STO) positioned above the main pole;
an STO shield positioned above the STO;
a return pole positioned above the STO shield; and
a back gap layer positioned between the yoke and the return pole, the back gap layer comprising at least one highly resistive material selected from the group consisting of: $XFe_2O_4$, $RFe_5O_{12}$, Fe, Co, Ni, FeCoNi, iron oxides, nickel oxides, cobalt oxides and manganese oxides,
wherein X is an element selected from the group consisting of Mn, Co, Ni, Zn, Cu, Fe, and
wherein R is a rare earth element,
wherein at least two of the yoke, the return pole, the main pole and the STO shield comprise at least one highly resistive material,
wherein the highly resistive material is characterized by a resistivity in a range from about 1 $\Omega$m to about $1\times10^4$ $\Omega$m, a saturation magnetic flux density of not less than about 0.1 T, and a thickness not less than about 10 nm,
wherein during operation of the head, a current flowing through the back gap material flows along a first current path characterized by a resistivity in not less than $1\times10^{-3}$ $\Omega$m, and
wherein during operation of the head, a current flowing through the STO along a second current path is delivered to the STO with about 100% efficiency.

19. A magnetic data storage system, comprising:
at least one head as recited in claim 18;
a magnetic medium;
a drive mechanism for passing the magnetic medium over the at least one head; and
a controller electrically coupled to the at least one head for controlling operation of the at least one head.

20. A method for forming the head as recited in claim 18, comprising:
forming the yoke;
forming the main pole above the yoke;
forming the STO above the main pole;
forming the return pole above the STO; and
forming the back gap layer between the yoke and the return pole.

* * * * *

UNITED STATES PATENT AND TRADEMARK OFFICE
CERTIFICATE OF CORRECTION

PATENT NO. : 8,842,387 B1  
APPLICATION NO. : 13/830810  
DATED : September 23, 2014  
INVENTOR(S) : Tomoya Horide et al.

Page 1 of 1

It is certified that error appears in the above-identified patent and that said Letters Patent is hereby corrected as shown below:

In the specification:

col. 5, line 11 replace "1 am" with --1 $\Omega$m--;

col. 13, line 38 replace "(Heft)" with --(Heff)--.

Signed and Sealed this  
Seventeenth Day of February, 2015

Michelle K. Lee  
*Deputy Director of the United States Patent and Trademark Office*